United States Patent [19]
Ziemer et al.

[11] 3,959,658
[45] May 25, 1976

[54] MICROWAVE DOSIMETER UTILIZING THERMOLUMINESCENT MATERIALS

[75] Inventors: Paul L. Ziemer; Richard J. Vetter, both of West Lafayette, Ind.; Donald R. Elle, Albuquerque, N. Mex.

[73] Assignee: Purdue Research Foundation, Lafayette, Ind.

[22] Filed: June 13, 1974

[21] Appl. No.: 478,433

[52] U.S. Cl. .............................. 250/484; 250/458; 250/474
[51] Int. Cl.² ....................................... H05B 33/00
[58] Field of Search ........... 250/337, 484, 483, 460, 250/458, 486, 474; 340/173.2, 173 CC

[56] References Cited
UNITED STATES PATENTS

| | | | |
|---|---|---|---|
| 2,546,160 | 3/1951 | Lengyel | 250/483 |
| 2,711,530 | 6/1955 | Rines | 250/484 |
| 3,374,473 | 3/1968 | Cummins | 340/173 CC |
| 3,480,918 | 11/1969 | Benson | 340/173 CC |
| 3,772,206 | 11/1973 | Hitomi et al. | 250/337 |
| 3,835,329 | 9/1974 | Moran et al. | 250/484 |

*Primary Examiner*—Harold A. Dixon

[57] ABSTRACT

The production of several thermoluminescent compounds, namely $BaTiO_3$, $SrTiO_3$, $BaZrO_3$, and mixtures thereof with and without an activator of dysprosium, and use thereof for microwave and ionizing radiation dosimetry is disclosed herein.

16 Claims, 1 Drawing Figure

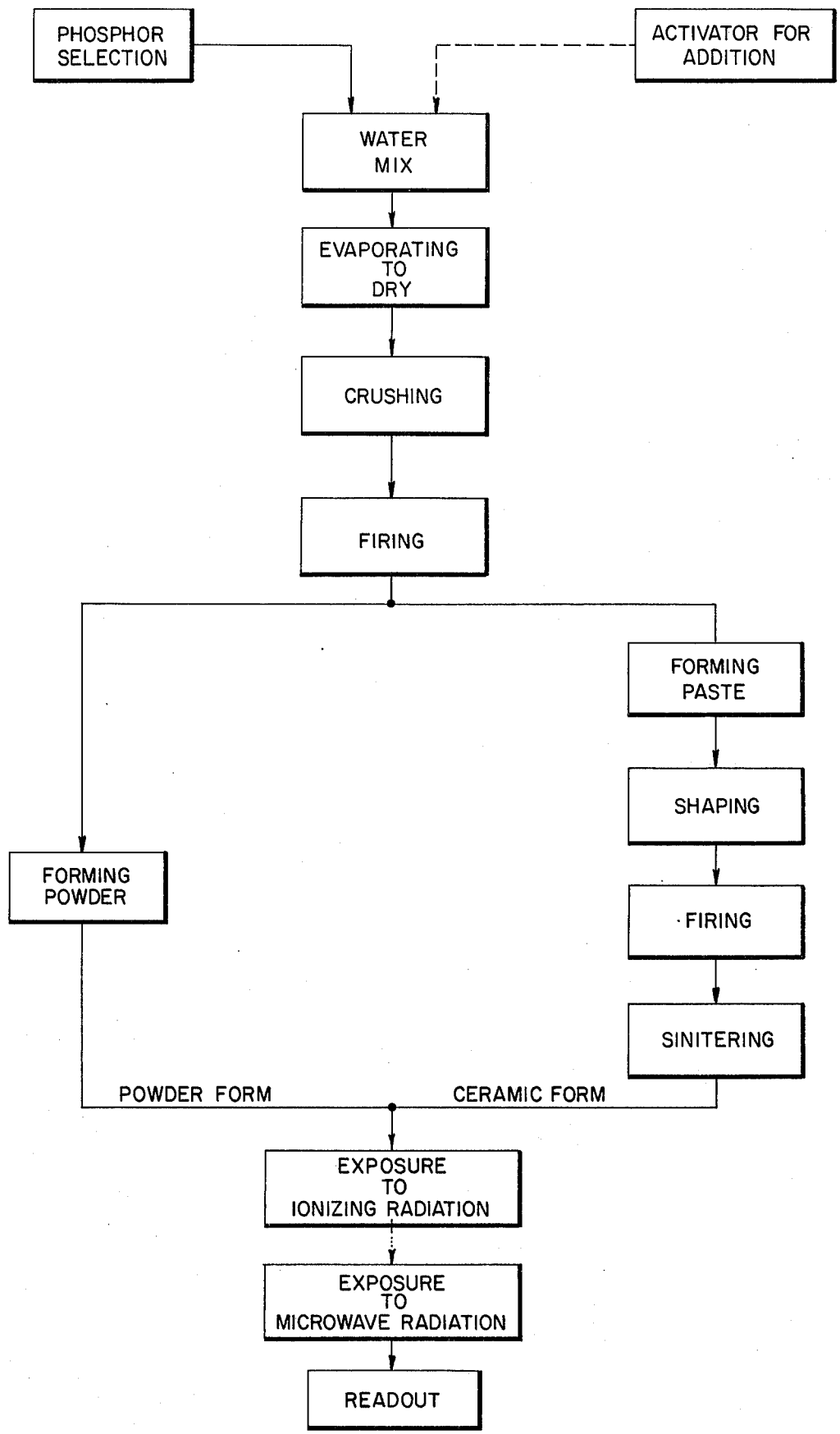

3,959,658

MICROWAVE DOSIMETER UTILIZING THERMOLUMINESCENT MATERIALS

BACKGROUND OF THE INVENTION

The invention described herein was made in the course of, or under, a grant from the National Institutes of Health, Department of Health, Education, and Welfare.

This invention relates to the preparation and use of certain thermoluminescent compounds for microwave and other type of radiation dosimetry. The purpose of the dosimeter is to provide a means of integrating microwave exposure received by an object, animal or person in a microwave field such as would exist in a research facility, a radar facility, an industrial microwave drying unit, or other such facilities. The materials could also be used for measuring doses from ionizing radiation including X and gamma rays.

Instruments presently used for determining microwave exposure levels utilize a probe which is attached to a bench monitor or hand-held meter. Such instruments do not integrate total exposure over a period of time, they require a power source to operate, and the probe and cord often disrupt the microwave field. This disruption results in a field which has different characteristics than when the probe and cord are not present.

There presently is no practical means of integrating microwave exposure. Existing instrumentation only measures levels of microwave radiation.

SUMMARY OF THE INVENTION

It is an object of this invention to provide a method for the preparation of thermoluminescent phosphors of $BaTiO_3$, $SrTiO_3$, or $BaZrO_3$ and mixtures thereof, with and without the activator dysprosium.

It is another object of this invention to provide a novel use of these compounds for measuring microwave radiation doses (microwave dosimetry).

DESCRIPTION OF THE INVENTION

This invention comprises a process for the production of particular thermoluminescent compounds useful for measuring microwave radiation doses. The single FIGURE of the drawing shows a flow diagram for producing the compound according to this invention.

The dosimeter consists of a chemical phosphor which may or may not be activated with an impurity and which may exist in a powder or ceramic or other solid state. The phosphor may be $BaTiO_3$, $SrTiO_3$ or $BaZrO_3$ and the activator is dysprosium (Dy). The phosphor may also be a mixture of $BaTiO_3$ and $SrTiO_3$. Activation is accomplished by dissolving the phosphor and activator in water, evaporating the solution to dryness, crushing and sieving the residue, and firing at 500°–1000°C for 1–36 hours. The final effective activator concentration ranges from 0.05–2 mole percent. Phosphors which are not activated are fixed in a similar manner. The mixture of phosphors consists of $BaTiO_3$ and $SrTiO_3$ in various proportions. The mixture is prepared in the same manner as the activated phosphors.

Ceramics are prepared from unactivated, activated, and mixed phosphors. Ceramics are made by mixing in proportions of about 1 gram of phosphor with about 0.5 ml liquified methyl cellulose (approximately 10 grams of methyl cellulose dissolved in approximately 80 ml water), shaping the paste mixture, and firing the paste. The ceramics can be made in various shapes and sizes by shaping the paste before it is fired. A convenient shape is a strip about 1.5 cm wide, several cm long, and about 0.5 mm thick. The shaped paste is prefired at about 650°C for about 1 hour to burn off the binder (methyl cellulose) and then sintered 1,300°C or higher for about 3 hours to form the ceramic.

These phosphors may be used as powders contained in paper envelopes, polyethylene tubes, or other such containers; or may be used as ceramics or other solid or extruded forms which can be made in specific sizes and shapes. In either form the phosphor sample is small in size which substantially reduces the potential disruption of the microwave field. Because the phosphors are small they may be implanted in animals to study the deposition of microwave energy in animal tissue.

Prior to use, the phosphor is exposed to a high dose of ionizing (gamma or X) radiation which saturates the electron traps in the crystal lattice of the phosphor. The phosphor is then exposed to microwave radiation which results in a reduction in the number of electron traps which are filled. At this point the thermoluminescent output of the phosphor is determined using equipment which is commercially available. The reduction in thermoluminescent output is directly related to the reduction in the number of electron traps which are filled which in turn is directly related to the amount of microwave exposure.

The present invention will be more fully understood by reference to the following specific examples.

EXAMPLE 1

The powder phosphors used for evaluating thermoluminescent response were $BaTiO_3$, activated with dysprosium, and a mixture of $BaTiO_3$ and $SrTiO_3$ in a ratio of 8:2 by weight [$(Ba_{0.8}Sr_{0.2})TiO_3$]. Ceramic phosphors were prepared using an organic binder (methyl cellulose) mixed with these powdered phosphors and firing them for 3 hours at 1385°C. The thermoluminescent properties of these phosphors had been predetermined.

Annealed thermoluminescent phosphor samples placed in paper envelopes were irradiated with $10^5$R of $^{60}$Co gamma radiation and then exposed to microwave radiation in an anechoic chamber, 305 × 244 × 213 cm high, with a −40 dB quiet zone. An exhaust fan was located in the ceiling near the back wall to maintain room temperature. A pyramidal horn connected a 1.5-kW 2450-MHz generator to the chamber. The power level was determined with a directional coupler and power meter, and power density was monitored with an electromagnetic radiation monitor. The thermoluminescent phosphors were exposed to power densities ranging from 200 to about 5000 mW/cm² in the anechoic chamber.

EXAMPLE 2

From a practical point of view, the use of a ceramic and the fading effects seen in the ceramic are of more interest than use of the powdered materials. This interest is due to several reasons, the most significant of which are the more exact knowledge of dielectric properties of the ceramic versus that of powder, and larger values of dielectric constant and loss tangent for the ceramic than the powder. Furthermore, a solid piece is more easily handled than a quantity of loose powder and can be formed in a specific shape before firing. The ceramics were produced from the activated phosphors of $BaTiO_3$ containing 0, 0.1, and 0.5 mole percent dysprosium, and the combination powder ($Ba_{0.8}Sr_{0.2}$-

)TiO$_3$. Preirradiated ceramics showed a marked reduction in thermoluminescent response when compared to a control stored at room temperature. Because of the difficulty in determining the temperature of a ceramic during or immediately after microwave exposure, a higher-than-room-temperature control was not used. However, the ceramics were not warm to the touch following the microwave exposure.

Ceramic pieces 2 cm or more in length, were placed on a styrofoam support in the anechoic chamber after $^{60}$Co irradiation and exposed to microwaves in a manner similar to the powder samples. Accurate determination of the effect of microwave exposure required multiple readouts of the same ceramic piece. After each readout, the ceramic was annealed for 30 minutes at 400°C and cooled to room temperature, then reirradiated with $^{60}$Co, exposed to microwaves, and read out. Because a limited number of ceramics was available, only the high power density of approximately 5000 mW/cm$^2$ was used to test for thermoluminescent fading. The reduction in response was energy fluence dependent; that is, the longer the microwave exposure, the greater the fading. The dysprosium-activated BaTiO$_3$ ceramics faded at approximately the same rate as the (Ba$_{0.8}$Sr$_{0.2}$)TiO$_3$ ceramic. Because of the preliminary nature of this study, the power density used was admittedly high with respect to personnel safety considerations. It is suggested that ceramics production and phosphor activation be optimized before more reasonable power densities are used.

Other obvious examples will be appreciated by those skilled in the art, and the scope of this invention is not limited to the examples aforementioned.

We claim:

1. The process of manufacture of a microwave sensitive material for use as a dosimeter comprised of the steps of:
    selection of a chemical phosphor having any of the chemical compositions of: BaTiO$_3$, SrTiO$_3$, or BaZrO$_3$,
    the thermoluminescent output of said selected phosphor being known;
    exposing said phosphor to a high dose of ionizing radiation sufficient to saturate the electron traps in the crystal lattice of said phosphor;
    whereby subsequent exposure to microwave radiation results in a reduction in the number of saturated electron traps so that measurement of the thermoluminescent output of said phosphor may be measured and said reduction in thermoluminescent output is directly related to the quantity of microwave exposure.

2. The process of manufacture of a dosimeter as described in claim 1, with the additional step of addition of an activator such as dysprosium before the ionizing radiation step is applied.

3. The process of manufacture of a dosimeter as described in claim 1 wherein an admixture of BaTiO$_3$ and SrTiO$_3$ is utilized as the phosphor.

4. A method for treating thermoluminescent compounds and utilizing the same for measuring radiation, said method comprising:
    selecting a chemical phosphor having electron traps in the crystal lattice of the phosphor that provides a predetermined thermoluminescent output that is dependent upon the number of electron traps then radiation saturated;
    exposing said selected chemical phosphor to a high dose of ionizing radiation sufficent to saturate the electron traps in the crystal lattice of the phosphor to provide a predetermined thermoluminescent output; and
    thereafter exposing said chemical phosphor to microwave radiation to be measured, said exposure reducing the number of saturated electron traps so that a decreased thermoluminescent output is provided by said chemical phosphor that is directly related to the amount of microwave exposure experienced by said chemical phosphor.

5. The method of claim 4 wherein said chemical phosphor is selected from the group including BaTiO$_3$, SrTiO$_3$ or BaZrO$_3$.

6. The method of claim 4 wherein said chemical phosphor is a mixture of BaTiO$_3$ and SrTiO$_3$.

7. The method of claim 5 wherein said chemical phosphor is treated by addition of an activator prior to exposure to said ionizing radiation.

8. The method of claim 7 wherein said activator is dysprosium.

9. The method of claim 4 wherein said selected chemical phosphor is exposed to ionizing radiation in the region of gamma or X radiation to saturate the electron traps in the crystal lattice of the phosphor.

10. The method of claim 4 wherein said chemical phosphor is fixed prior to exposure to said ionizing radiation by being dissolved in water, evaporated to dryness, crushed and fired at 500° to 1000°C for a period of 1 to 36 hours.

11. The method of claim 10 wherein said phosphor exposed to said ionizing radiation is exposed in powder form.

12. The method of claim 4 wherein a ceramic is made from said selected phosphor prior to exposure to said ionizing radiation.

13. The method of claim 12 wherein said ceramic is made by mixing said selected phosphor with liquified methyl cellulose into a paste mixture, shaping the paste mixture as desired, and firing the paste mixture at about 650°C for about 1 hour to burn off the methyl cellulose binder followed by sintering at at least 1,300°C for about 3 hours.

14. A thermoluminescent compound useful for measuring radiation, said compound being from the group including BaTiO$_3$, SrTiO$_3$ and BaZrO$_3$ with said compound having the electron traps in the cyrstal lattice of the compound saturated by exposure to ionizing radiation so that subsequent exposure of said compound to microwave radiation will cause a reduction in the number of saturated electron traps and result in a decreased thermoluminescent output that is indicative of the amount of microwave exposure experienced by said compound.

15. The compound of claim 14 wherein said compound is in a powder form.

16. The compound of claim 14 wherein said compound is in the form of a ceramic.

* * * * *